United States Patent [19]

Simonz

[11] Patent Number: 4,955,452
[45] Date of Patent: Sep. 11, 1990

[54] LOCKING APPARATUS FOR SKID STEER LOADER

[75] Inventor: John C. Simonz, Germantown, Wis.

[73] Assignee: Trak International, Inc., Port Washington, Wis.

[21] Appl. No.: 341,116

[22] Filed: Apr. 20, 1989

[51] Int. Cl.⁵ ............................................. B60R 21/02
[52] U.S. Cl. .................................. 180/271; 180/268; 180/275
[58] Field of Search ............... 180/315, 326, 330, 271, 180/331, 286, 268, 275

[56] References Cited

U.S. PATENT DOCUMENTS

| | | | |
|---|---|---|---|
| 3,635,365 | 1/1972 | Bauer | 180/6.48 |
| 4,355,819 | 10/1982 | Frisbee | 180/271 |
| 4,388,980 | 6/1983 | Vig et al. | 180/271 |
| 4,391,344 | 7/1983 | Weber et al. | 180/271 |
| 4,579,191 | 4/1986 | Klee et al. | 180/268 |
| 4,673,054 | 6/1987 | Burke et al. | 180/271 |

*Primary Examiner*—Richard A. Bertsch
*Attorney, Agent, or Firm*—Michael, Best & Friedrich

[57] ABSTRACT

A locking apparatus for a skid steer loader which is operable to secure the wheels against movement, the locking apparatus including a support tube disposed in substantially coaxial alignment with an aperture formed in a drive sprocket, a locking member slideably housed in the support tube and reciprocally moveable between a retracted position and a locking position, a pair of biasing springs individually housed in the support tube and positioned on opposite ends of the locking member; and a control cable for urging the locking member into the locking position.

14 Claims, 2 Drawing Sheets

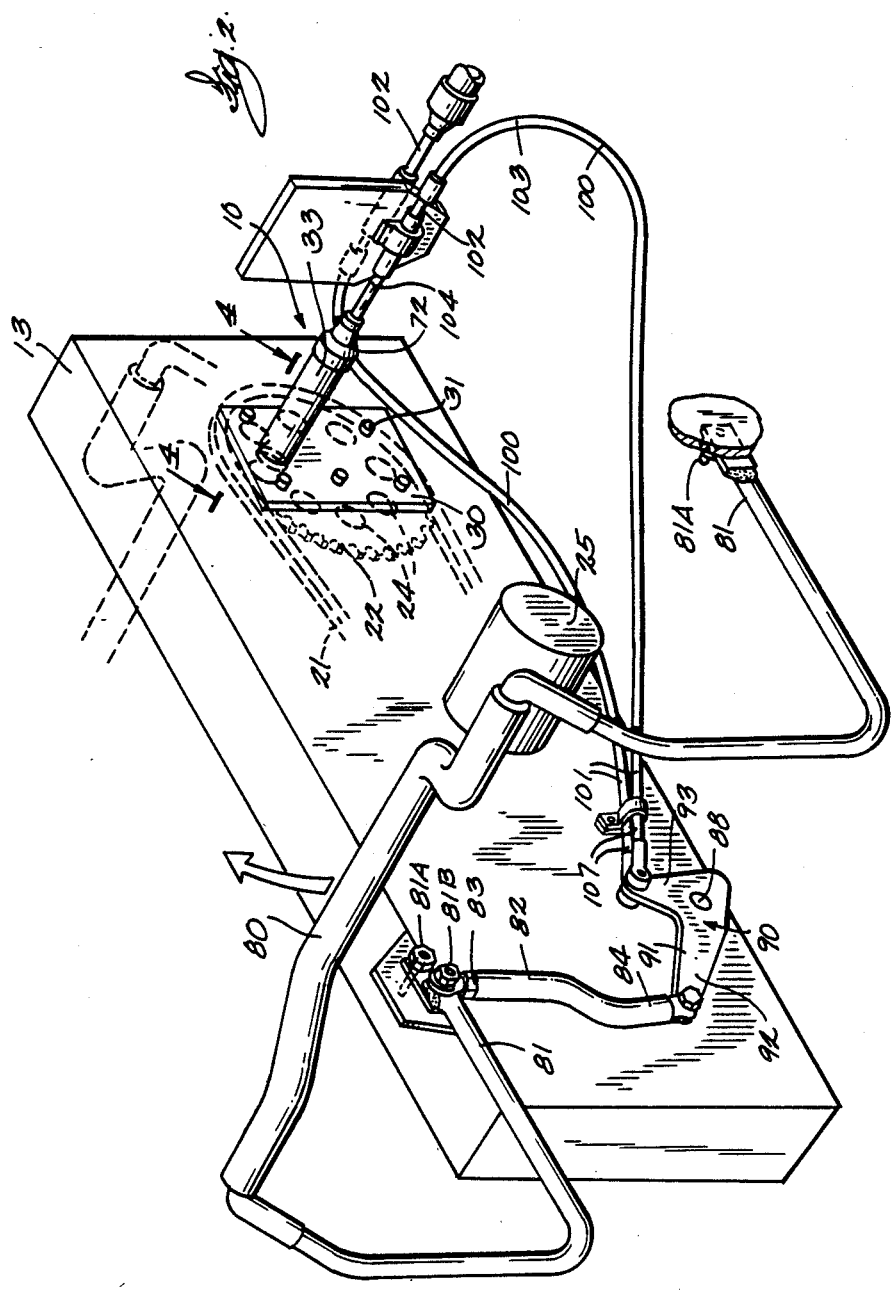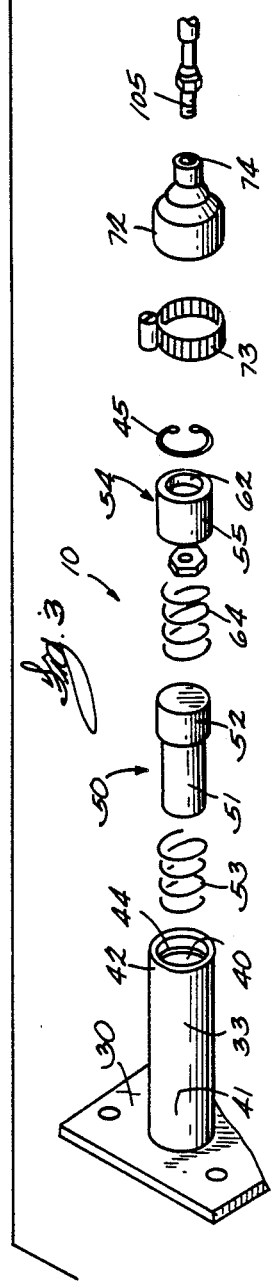

LOCKING APPARATUS FOR SKID STEER LOADER

BACKGROUND OF THE INVENTION

1. Field of the Invention

The present invention relates to skid steer loaders, and more particularly to a locking apparatus which inhibits the movement of a skid steer loader when an operator restraint bar is moved to a position wherein the operator can move into or out of the skid steer loader.

2. Description of the Prior Art

An operator restraint system of the type used in skid steer loaders is illustrated in U.S. Pat. No. 4,579,191 to Klee et al. The operator restraint bar shown in that patent holds the operator in position in the vehicle cab when the vehicle is in operation, and is pivotable between a restraint position and a raised or retracted position, wherein the operator can move into or out of the cab of the skid steer loader. Prior art skid steer loaders have included a locking brake system which is operably coupled to the operator restraint bar and adapted to brake the skid steer loader drive system when the operator restraint bar is moved from an operator restraining position to the raised or retracted position. The drive systems of skid steer loaders normally include a pair of hydraulic drive motors which are individually operable, through a chain drive system, to drive the wheels on one side of the vehicle. In one prior art braking arrangement, a disc brake is mounted on the drive shaft of each of the hydraulic drive motors, and brake calipers are provided for gripping the discs upon movement of a brake lever to a lock position to thereby brake the vehicle.

SUMMARY OF THE INVENTION

The present invention provides an improved locking apparatus for use on a skid steer loader.

One object of the present invention is to provide such a locking apparatus which has particular utility for mechanically locking the vehicle wheels of a skid steer loader when the operator restraint bar is moved to a retracted or inoperative position.

Another object of the present invention is to provide a locking apparatus which releases the vehicle wheels in the event that the linkage connecting the operator restraint bar and the locking apparatus fails or is otherwise rendered inoperable.

Another advantage of the structure of the invention is that a pair of brakes are provided, one on each side of the skid steer loader. In the event one brake fails, the other brake will effectively brake the skid steer loader.

Further objects and advantages are to provide improved elements and arrangements thereof in a locking apparatus for the purposes described which is dependable, durable, and fully effective in accomplishing its intended purposes.

BRIEF DESCRIPTION OF THE DRAWINGS

FIG. 2 is a perspective view of an operator restraint bar and a locking apparatus included in the skid steer loader shown in FIG. 1.

FIG. 3 is a fragmentary, perspective, exploded view of components of the locking apparatus shown in FIG. 2.

DESCRIPTION OF THE PREFERRED EMBODIMENT

Figure 4:
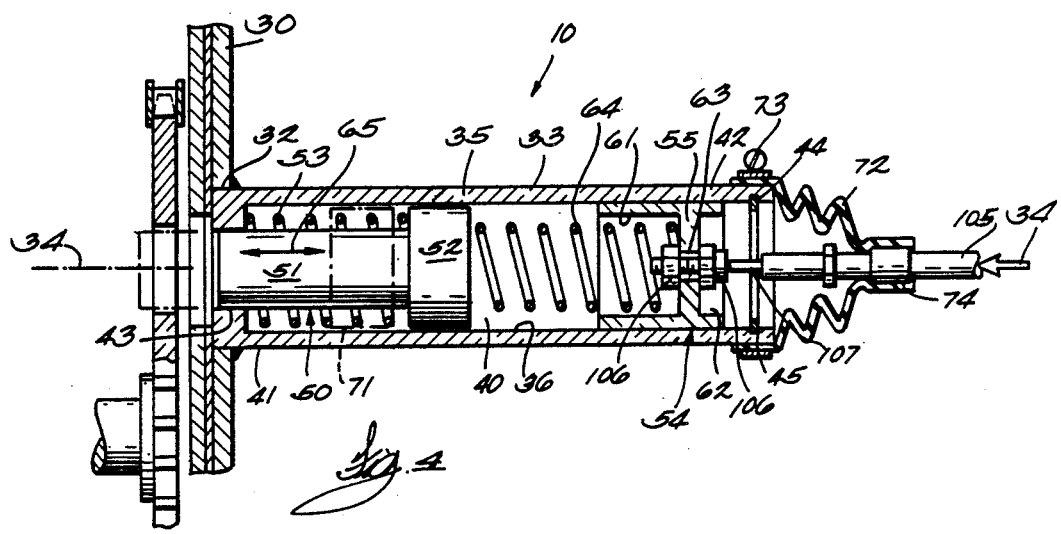
FIG. 4 is a fragmentary, longitudinal, vertical, sectional view of the locking apparatus of the present invention taken from a position along line 4—4 of FIG. 2.

Referring to the drawings, a locking apparatus embodying the present invention is generally indicated by the numeral 10 in FIGS. 3 and 4. For illustrative convenience, the locking apparatus is shown and described as it would be configured if it were manufactured as an integral component. However, it should be understood that the locking apparatus of the subject invention can be employed in other applications.

Figure 1:
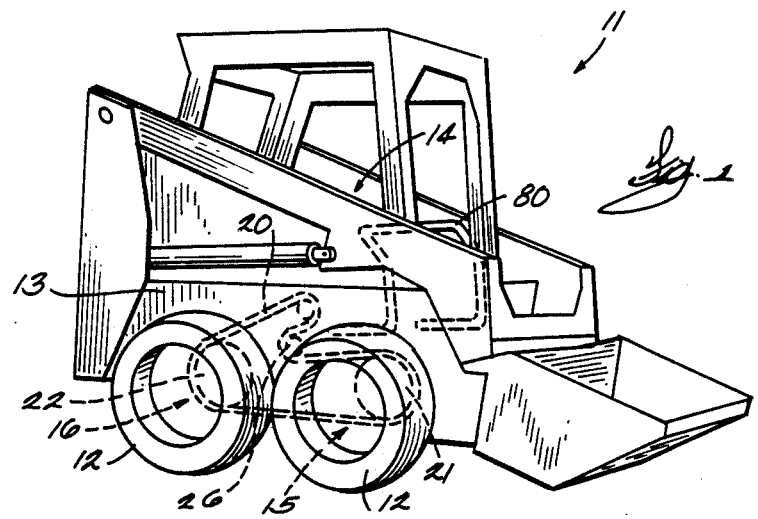
FIG. 1 is a perspective, side elevation view of a skid steer loader including the locking apparatus of the present invention.
Figure 5:
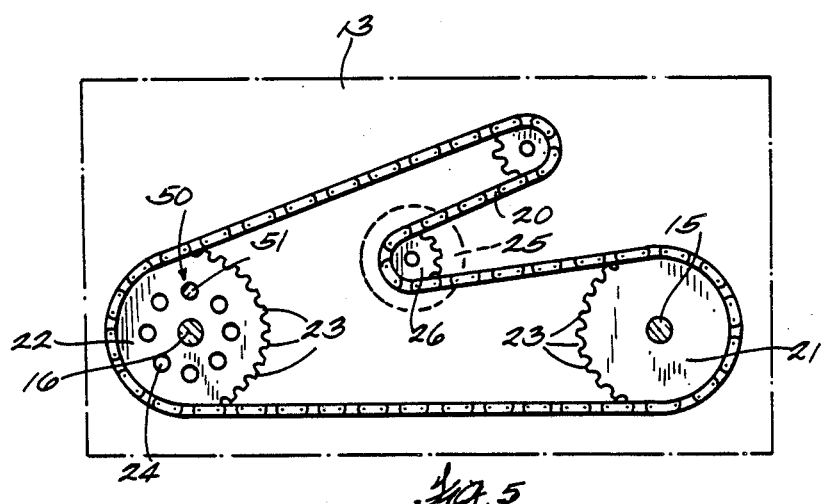
FIG. 5 is a partial, side elevation view of the skid steer loader shown in FIG. 1, and showing the drive chain, and drive sprockets thereof.

As shown in the drawings, the locking apparatus 10 is mounted on a skid steer loader 11 which has a plurality of wheels 12 which support a frame 13 for movement along the ground. The frame 13 of the skid steer loader includes an operator's position 14, and the wheels 12 are individually rotatably mounted on front axles 15 and rear axles 16. As best seen by reference to FIGS. 1 and 5, a drive chain 20 is operable to drivingly engage a front drive sprocket 21 and a rear drive sprocket 22. The front and rear drive sprockets each have a multiplicity of teeth 23 and further, the rear drive sprocket 22 includes a multiplicity of radially positioned apertures 24 which are disposed in substantially equally spaced, radially extending relation relative to the axis of rotation of the rear axle 16. As best illustrated by reference to FIGS. 2 and 5, each side of the skid steer loader includes a hydraulic drive motor 25 which is mounted on the frame 13 and operable to impart rotational movement to a motor sprocket 26 which is disposed in driving engagement relative to the drive chain 20. In this fashion, each drive motor is operable to impart rotational movement to the front and rear drive sprockets 21 and 22, respectively.

As seen most clearly by reference to FIG. 2, a base plate 30 is fixed to the frame 13 by a plurality of bolts or other fasteners 31, and a circular hole 32 is provided in the base plate 30 and the frame 13 and is located such that the individual apertures 24 of the rear drive sprocket can periodically move into substantially coaxial alignment with the hole 32. This relationship is best shown in FIG. 4. Referring more particularly to FIG. 4, a tubular housing or support tube 33, is secured to the base plate 30 by welding or the like. The tubular housing 33 has a longitudinal axis 34, and outside and inside surfaces 35 and 36 respectively. The inside surface 36 defines a substantially cylindrical cavity or bore 40. The tubular housing further has a first end 41 which is secured to the base plate 30, and a second end 42. A channel or bore 43 of reduced diameter is formed in the first end 41 and an annular groove 44 is formed in the inside surface 36 in close proximity to the second end of the tubular housing. The annular groove 44 houses a snap ring 45.

As best shown in FIG. 4, a locking member or pin 50 is slidably mounted in the cavity 40. The locking member 50 is reciprocally moveable into and out of locking engagement with the individual apertures 24 which are formed in the rear drive sprocket 22. The locking member includes a shaft 51, and a head or plunger portion 52 is mounted on the shaft and is slidably housed in the cavity 40. A first biasing spring, or pin return spring 53 surrounds the shaft 51 and is disposed between the head 52 and the first end 41 of the tubular housing 33.

A piston 54 is slidably mounted for reciprocal movement in the cylindrical cavity 40. The piston has a main body 55 which includes first and second cavities 61 and 62 respectively. Further, the main body has a substantially centrally disposed bore 63 which is disposed in substantially coaxial alignment with the longitudinal axis 34 of the tubular housing 33. A second biasing spring, or pin advancement spring 64 is also housed in the cavity 40 and is positioned between the head or plunger portion 52 and the piston 54. As shown most clearly by reference to FIG. 4, a portion of the second biasing spring is slidably received or housed in the first cavity 61. Movement of the piston 54 toward the first end 41 of the tubular housing 33 causes a substantially simultaneous longitudinal movement of the locking member 50 such that a portion of the shaft 51 extends out of the tubular housing 33 and is received in one of the several apertures 24 which are individually formed in the rear drive sprocket 22. This relationship is most clearly shown in FIGS. 4 and 5.

The locking member or pin 50 is selectively moveable along a path of travel 65 between a retracted position (shown in solid lines in FIG. 4) wherein the pin is positioned substantially internally of the tubular housing 35 and an extended or locking position (shown in phantom in FIG. 4) wherein an end portion of the shaft 51 projects from the tubular housing, and is slidably received in one of the apertures 24. As illustrated most clearly in FIGS. 2 and 4, a flexible boot 72 surrounds the second end 42 of the tubular housing 33. One end of the flexible boot 72 surrounds and is fixed to the tubular housing by a clamp 73, and an opposite end 74 of the boot surrounds a control cable 100 which will hereinafter be discussed in greater detail.

As best illustrated by reference to FIG. 2, an operator restraint bar is pivotally mounted on the frame 13. The operator restraint bar 80 has opposite ends 81 which are rotatably mounted on the frame by suitable fasteners 81A. An actuating rod 82 is connected to one end of the operator restraint bar 80 by a fastener 81B, the fastener 81B defining a pivot axis spaced from the pivot axis defined by the fastener 81A. The actuating rod 82 has a first end 83 which is fixed to the operator restraint bar by the fastener 81B, and a second end 84. The operator restraint bar 80 pivots about the fasteners 81A and moves along a path of travel between an operator restraining position shown in solid lines in FIG. 2, to a raised or locking position (shown in phantom lines in FIG. 2), wherein the operator can move freely into and out of the operator's position 14.

As best illustrated by reference to FIG. 2, a bell crank 90 is pivotally mounted on the frame 13 by a pivot pin 88. The bell crank has a substantially L-shaped main body 91 with a first crank arm 92 having an end pivotally secured to the second end 84 of the actuating rod, and a second crank arm 93 having an end connected to the ends 107 of a pair of cable cores 104 of control cables 100. Each control cable 100 includes an outside sheath 103 having opposite first and second ends 101 and 102 respectively, the opposite ends 101 and 102 being fixedly supported by the skid steer loader frame, and the outside sheath 103 slidably housing the cable core 104 (FIG. 4). The cable core 104 also has an end portion 105 which is fixed to a connector 107, in turn, secured to the piston 54 by nuts 106.

OPERATION

As best illustrated by reference to FIGS. 2 and 4, the locking apparatus 10 is borne by the frame 13 and positioned adjacent to the rear drive sprocket 22 of the skid steer loader 11. The rear drive sprocket includes a plurality of apertures 20 which individually become aligned with the pin 50. The pin 50 is reciprocally moveable in the tubular housing 33, and is urged from a retracted position 70 to an extended or locking position 71 when the piston 54 is urged toward the first end 41 of the tubular housing by the movement of the cable 104. The movement of the cable core 104 with respect to the outside sheath 103 is caused by the movement of the operator restraint bar 80 when it is urged from the operator restraining position to the retracted or locking position. Upon moving the operator restraint bar to the locking position, the piston is urged toward the first end of the housing thereby compressing the second biasing spring 64. The second biasing spring 64 applies force to the locking member thereby urging it from the retracted to the locking position. This movement of the locking member to the locking position compresses the first biasing spring 53. When the projecting end of the shaft 51 extends into one of the apertures, the rear drive sprocket 22 and the wheels 12 on that side of the skid steer loader are thereby rendered immoveable. When the operator restraint bar 80 is moved to the operator restraining position, the piston 54 is moved by the cable core 104 toward the second end of the housing 42, and the first biasing spring 53 moves the locking member 50 from the locking position to the retracted position. This feature is important inasmuch as failure of the control cable will not render the skid steer loader inoperable because the first biasing spring has sufficient strength, after compression, to urge the locking member into the retracted position, should the control cable break, for example.

While one rear drive sprocket and locking member have been described, in a preferred form of the invention locking members are provided on both sides of the skid steer loader as illustrated in FIG. 2. In the event of failure of a cable operably connected to one of the locking members, the other locking assembly will be functional to securely brake the skid steer loader.

I claim:
1. A skid steer loader comprising:
a frame;
wheels for supporting the frame for movement;
a drive motor supported by the frame;
means for drivingly connecting the drive motor to at least one of the wheels for driving the wheel, the means for drivingly connecting including a rotatable member supported for rotation about an axis and having at least one aperture radially spaced from the axis of rotation of the rotatable member;
an operator restraint bar moveable between an operator restraining position and a retracted position;
means for locking at least one of the wheels when the operator restraint bar is moved to the retracted position, the means for locking including a locking member moveable between a retracted position and a locking position, and wherein in the locking position a portion of the locking member is housed in the aperture formed in the rotatable member;

means connected to the operator restraint bar for moving the locking member to the locking position when the restraint bar is in the retracted position; and means for biasing the locking member toward the retracted position when the operator restraint bar is positioned in the operator restraining position.

2. The apparatus of claim 1 wherein the means for biasing the locking member toward the retracted position includes a compression spring.

3. The apparatus of claim 2 wherein the means for locking includes a support tube housing supporting the locking member for reciprocal movement, and wherein the compression spring is housed in the housing and engages the locking member.

4. The apparatus of claim 3 wherein the means connected to the operator restraint bar for moving the locking member includes a control cable including a sheathe and a cable slidably housed in the sheathe, and movement of the operator restraint bar causes a substantially simultaneous movement of the cable.

5. The apparatus of claim 4 wherein the locking member includes a locking pin housed in the tubular housing for reciprocal slideable movement between the retracted position and the locking position, and wherein at least a portion of the locking pin projects from one end of the housing, and the compression spring surrounds the locking pin and is compressed between a portion of the locking pin and a portion of the tubular housing and thereby biases the locking pin toward the retracted position.

6. The apparatus of claim 5 wherein the means connected to the operator restraint bar for moving the locking member further includes a piston housed in the support tube and mounted to the cable, and a second compression spring is disposed between the piston and the locking pin, the second compression spring biasing the locking pin toward the locking position.

7. A locking apparatus for releasably braking at least one wheel of a skid steer loader, and wherein the skid steer loader includes a rotatable drive sprocket mounted in driving relation relative to the wheel, the drive sprocket having an aperture radially spaced from the axis of rotation of the sprocket, the locking apparatus comprising:

a frame mounted on the skid steer loader;

a support tube borne by the frame and having a bore, the support tube positioned such that upon rotation of the drive sprocket the aperture can be positioned in substantially coaxial alignment with the bore;

a locking member slidably housed in the bore and reciprocally moveable between a retracted position and locking position;

means for biasing the locking member toward the retracted and the locking positions, the biasing means received in the bore; and means for urging the locking member into the locking position, the urging means acting on the biasing means thereby causing the locking member to move from the retracted position into the locking position, the locking member received in the aperture of drive sprocket thereby impeding rotational movement of the wheel.

8. The apparatus of claim 7 wherein the biasing means includes first and second biasing springs, the first biasing spring operable to bias the locking member into the retracted position, and the second biasing spring operable to bias the locking member into the locking position.

9. The apparatus of claim 8 wherein the urging means comprises:

a piston slidably housed in the bore and operable to exert force on the second biasing spring;

a control cable having a first end mounted on the piston and a second end; and a manually moveable operator restraint bar mounted on the skid steer loader and pivotably moveable between an operator restraining position and a retracted position, the operator restraint bar connected to the second end of control cable, and movement of operator restraint bar from the operator restraining position to the retracted position causing force to be transmitted through the cable to the piston thereby urging the locking member to move from the retracted position to the locking position.

10. Apparatus for selectively locking a rotatable member against rotation, the rotatable member including an aperture formed in the rotatable member and spaced radially outwardly from the axis of rotation of the rotatable member, the apparatus comprising:

a frame;

a support tube supported by the frame and including a central bore and the support tube disposed in a position wherein the aperture in the rotatable member can be aligned with the bore of the support tube;

a locking member housed in the support tube and reciprocally moveable between a retracted position and a locking position;

a first biasing means housed in the support tube and operable to bias the locking member toward the retracted position;

a second biasing means housed in the support tube and operable to bias the locking member toward the locking position; and means for urging the locking member into the locking position, the means for urging the locking member into the locking position acting on the first and second biasing means to cause compression of the first and second biasing means.

11. The apparatus of claim 10 wherein the rotatable member is a drive sprocket mounted on an axle of a vehicle, and the sprocket includes a plurality of radially spaced apertures.

12. The apparatus of claim 11 wherein the support tube includes a tubular housing having a longitudinal axis and first and second ends, and the locking member includes a shaft having a head which slidably is received in the housing, and the first and second biasing means includes first and second biasing springs which are slidably received in the housing, the first biasing spring disposed between the head and the first end of the housing, and the second biasing spring disposed between the head and the second end of the housing.

13. The apparatus of claim 12 wherein the means for urging the locking member into the locking position includes a piston slidably mounted in the housing and reciprocally moveable along the longitudinal axis, the piston receiving the second biasing spring and disposed between the second biasing spring and the second end of the housing, and a control cable including a sheathe, and a cable slideably housed in the sheathe, the cable having a first end mounted on the piston, and a second end, and a manually moveable operator restraint bar is mounted on the second end of the cable and is adapted to move the cable within the sheathe, the movement of cable causing substantially simultaneous longitudinal movement of the piston in the support tube.

14. The apparatus of claim 13 wherein the first biasing spring is operable, when placed into compression, to urge the locking member toward the retracted position, and the piston is operable when urged along the tubular housing and toward the first end of the housing to place each of the biasing springs into compression, the movement of the piston toward the first end of the housing causing the locking member to move from the retracted position to the locking position, and wherein in the locking position, a portion of the shaft projects from the first end of the housing and is received in one of the apertures of the drive sprocket thereby impeding rotational movement of the drive sprocket.

* * * * *